US011030907B1

(12) United States Patent
S et al.

(10) Patent No.: US 11,030,907 B1
(45) Date of Patent: Jun. 8, 2021

(54) METHODS, SYSTEMS, AND APPARATUSES FOR IDENTIFYING AND INDICATING THE SECONDARY RUNWAY AIMING POINT (SRAP) APPROACH PROCEDURES

(71) Applicant: HONEYWELL INTERNATIONAL INC., Morris Plains, NJ (US)

(72) Inventors: Anoop S, Bangalore (IN); Sabu Mathew, Bangalore (IN); Nathan Krishna Moorthy, Bangalore (IN); Sunitha Panchangam, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/983,191

(22) Filed: Aug. 3, 2020

(30) Foreign Application Priority Data

Jun. 19, 2020 (IN) ............................ 202011025990

(51) Int. Cl.
*G01C 23/00* (2006.01)
*G08G 5/02* (2006.01)
*G08G 5/00* (2006.01)

(52) U.S. Cl.
CPC ........... *G08G 5/025* (2013.01); *G08G 5/0013* (2013.01); *G08G 5/0021* (2013.01); *G08G 5/0047* (2013.01)

(58) Field of Classification Search
None
See application file for complete search history.

(56) References Cited

U.S. PATENT DOCUMENTS 6,177,888 B1 1/2001 Cabot et al.
6,865,452 B2 3/2005 Burdon
6,963,291 B2 11/2005 Holforty et al.
(Continued)

FOREIGN PATENT DOCUMENTS

CN 108198462 B 12/2018
CN 110473431 A 11/2019
(Continued)

OTHER PUBLICATIONS

Bellamy, Woodrow III, "Eurocontrol Evaluates Feasibility of Secondary Runway Approaches," ATM Modernization, Nov. 22, 2019.
(Continued)

*Primary Examiner* — Brent Swarthout
(74) *Attorney, Agent, or Firm* — Lorenz & Kopf, LLP

(57) ABSTRACT

Methods, systems, and apparatuses are provided for a Secondary Runway Aiming Point (SRAP) procedure of an approach by an ownship that includes identifying at least one aircraft making an approach that satisfy a set of preconditions to pair the aircraft to the ownship in the SRAP procedure; calculating a set of results based on lateral and vertical deviations of a paired SRAP aircraft to the ownship, and differential lateral and vertical rates of the paired SRAP aircraft to the ownship; deriving one or more points from the calculated set of results to determine whether in a flight path of the ownship there is an occurrence of an intrusion into a wake of the paired SRAP aircraft during the approach, and generating graphic data to present on the cockpit display the occurrence of the intrusion in the wake of the flight path of the ownship to the paired SRAP aircraft.

20 Claims, 7 Drawing Sheets

(56) References Cited

U.S. PATENT DOCUMENTS

| | | | | |
|---|---|---|---|---|
| 8,219,264 | B1 * | 7/2012 | Blake | G08G 5/0052 701/3 |
| 8,506,300 | B2 | 8/2013 | Baranov et al. | |
| 9,613,537 | B2 | 4/2017 | Meserole, Jr. et al. | |
| 9,911,342 | B2 | 3/2018 | Herder | |
| 2017/0301251 | A1 * | 10/2017 | Robin | G08G 5/0008 |
| 2019/0213890 | A1 * | 7/2019 | Hosamani | G08G 5/006 |
| 2020/0064866 | A1 | 2/2020 | Landers et al. | |

FOREIGN PATENT DOCUMENTS

| | | | |
|---|---|---|---|
| WO | 00/10064 | A1 | 2/2000 |
| WO | 2009/029005 | A2 | 3/2009 |

OTHER PUBLICATIONS

Bernie, Par, SESAR Research Reveal Promising Results on Increasing Runway Capacity and Reducing Noise at Airports, Nov. 30, 2019, downloaded from: http://www.aerobernie.com/2019/11/sesar-research-reveal-promising-results-increasing-ru . . . on Jul. 31, 2020.

* cited by examiner

METHODS, SYSTEMS, AND APPARATUSES FOR IDENTIFYING AND INDICATING THE SECONDARY RUNWAY AIMING POINT (SRAP) APPROACH PROCEDURES

CROSS REFERENCE TO RELATED APPLICATION

This application claims priority to Indian Provisional Patent Application No. 202011025990, filed Jun. 19, 2020, the entire content of which is incorporated by reference herein.

TECHNICAL FIELD

The subject matter described herein generally relates to vehicle systems, and more particularly, embodiments of the subject matter are related to aircraft systems for enabling secondary runway aiming point (SRAP) approach procedures.

BACKGROUND

With the anticipated increases in air traffic, it is expected that busy airports will struggle to cope with the increased number of arriving aircraft. The result is that at any given time, there can be congestion prior to landing at the airport. In order to overcome the congestion, aircraft are given slots to make an approach and landing that are carefully constructed based on the departure times and fuel of the aircraft when making the approach. However, traffic jams continue to exist because of a limited number of slot allocations available for aircraft when making approaches at destination airports. Also, other possible alternatives to remedy this problem, like constructing new runways to increase runway availability for aircraft landings, can not only prove to be an extremely expensive option due to the high cost of construction, the real estate requirements, and the need to ensure civilian populations residing nearby are not adversely affected, etc. but may not even be feasible at airports (especially those near large urban centers) due to land restrictions.

To confront this traffic issue, the European Organization for the Safety of Air Navigation (EUROCONTROL) has undertaken a number of initiatives to confront air traffic congestion to alleviate the expected increased traffic loads at various hubs in Europe. One such initiative is called the Secondary Runway Aiming Point (SRAP), which is being evaluated by the EUROCONTROL for feasibility, with the aim to increase the runway throughput by as much as 5 percent without any construction or other modifications to the existing airport's infrastructure.

Accordingly, it desirable to improve pilot situational awareness, alleviate airport traffic congestion, and mitigate the turbulence of multiple vehicles operating near the ownship during the approach to the airport by implementing an SRAP application for use with aircraft systems. Other desirable features and characteristics will become apparent from the subsequent detailed description and the appended claims, taken in conjunction with the accompanying drawings and the foregoing technical field and background.

BRIEF SUMMARY

Methods, systems, and apparatuses are provided for identifying and indicating the secondary runway aiming point (SRAP) approach procedures.

One exemplary method provides a Secondary Runway Aiming Point (SRAP) procedure of an approach by an ownship to an airport. The method includes initiating, by a SRAP application hosted by a processor of the ownship, the SRAP procedure during an approach flight phase to the airport, wherein the processor is configured to perform the steps of: identifying at least one aircraft from a plurality of aircraft making approaches to the airport during the ownship's approach flight phase that satisfy a set of preconditions in order to pair an aircraft which has been identified to the ownship in the SRAP procedure; calculating a set of results based on lateral and vertical deviations of a paired SRAP aircraft to the ownship, and differential lateral and vertical rates of the paired SRAP aircraft to the ownship; deriving one or more points from the calculated set of results based on the lateral and vertical deviations, and differential rates to determine whether in a flight path of the ownship an occurrence of an intrusion occurs into a wake of the paired SRAP aircraft during the approach flight phase to the airport; and generating graphic data to send to a cockpit display to present on the cockpit display an occurrence of the intrusion in the wake of the flight path of the ownship to the paired SRAP aircraft during the approach flight phase.

In various exemplary embodiments, the method includes displaying, by the configured processor, on the cockpit display, a pair of vertical profiles displaying the flight path of the ownship and the paired SRAP aircraft together for monitoring an intrusion in the wake of the paired SRAP aircraft in the flight path of the ownership. The method further includes displaying, by the configured processor, on the cockpit display, distances between the ownship and the paired aircraft in the vertical profiles of the flight path of the ownship and the paired SRAP aircraft to visually monitor for an intrusion in the wake of the paired SRAP aircraft by the ownship. The method further includes generating, by the configured processor, a visual alert for the intrusion in the wake of the paired SRAP aircraft by the ownship during the approach flight phase to the airport. The method further includes generating, by the configured processor, the visual alert in advance of the wake intrusion by the ownship to enable corrective action by the ownship for the wake intrusion in the approach flight phase.

The method includes generating, by the configured processor, the visual alert in advance with at least a two-minute period of remaining flight time by the ownship in the approach flight phase. The method further includes sending, by the configured processor, the graphic data to display the visual alert on a multi-function display (MFD) within the cockpit display. The method further includes receiving, by the configured processor, user input of a selection of the aircraft on the MFD amongst a display of a set of aircraft to pair with the ownship by the SRAP application. The method further includes in response to user input of the selection of the SRAP paired aircraft, displaying by the configured processor, information about the SRAP paired aircraft on a graphic user interface (GUI) within the MFD.

Another exemplary method provides a system to execute a Secondary Runway Aiming Point (SRAP) procedure for an approach by an ownship to an airport. The system includes a processor configured to initiate the SRAP procedure by executing a SRAP application hosted by the processer of the ownship during an approach flight phase to the airport; the processor is configured to identify by executing the SRAP application at least one aircraft from a plurality of aircraft making approaches to the airport during the ownship's approach flight phase that satisfy a set of preconditions in order to pair an aircraft which has been identified to the ownship in the SRAP procedure. The processor is configured to calculate a set of results based on lateral and vertical deviations of a paired SRAP aircraft to the ownship, and differential lateral and vertical rates of the paired SRAP aircraft to the ownship. The processor is configured to derive one or more points from the calculated set of results based on the lateral and vertical deviations, and differential rates to determine whether in a flight path of the ownship any occurrence of an intrusion occurs into a wake of the paired SRAP aircraft during the approach flight phase to the airport. The processor is configured to send graphic data to a cockpit display to present on the cockpit display any occurrence of the intrusion in the wake of the flight path of the ownship to the paired SRAP aircraft during the approach flight phase.

In various exemplary embodiments, the system includes the processor configured to display, on the cockpit display, a pair of vertical profiles displaying the flight path of the ownship and the paired SRAP aircraft together to monitor an intrusion in the wake of the paired SRAP aircraft in the flight path of the ownership. The system includes the processor configured to display, on the cockpit display, distances between the ownship and the paired aircraft in the vertical profiles of the flight path of the ownship and the paired SRAP aircraft to visually monitor for an intrusion in the wake of the paired SRAP aircraft by the ownship. The processor is configured to generate a visual alert for the intrusion in the wake of the paired SRAP aircraft by the ownship during the approach flight phase to the airport. The processor configured to generate the visual alert in advance of the wake intrusion by the ownship to enable corrective action by the ownship for the wake intrusion in the approach flight phase. The processor is configured to generate the visual alert in advance with at least two minutes of remaining flight time by the ownship in the approach flight phase. The processor is configured to send the graphic data to display the visual alert on a multi-function display (MFD) within the cockpit display. The processor is configured to receive user input of a selection of the aircraft on the MFD amongst a display of a set of aircraft to pair with the ownship by the SRAP application. The processor is configured to, in response to user input of the selection of the SRAP paired aircraft, display information about the SRAP paired aircraft on a graphic user interface (GUI) within the MFD.

In yet another embodiment, an apparatus to execute a Secondary Runway Aiming Point (SRAP) procedure for an approach by an ownship to an airport is provided. The apparatus includes at least one processor deployed on a computing device, the at least one processor programmed to: to identify by executing the SRAP application at least one aircraft from a plurality of aircraft making approaches to the airport during the ownship's approach flight phase that satisfy a set of preconditions in order to pair an aircraft which has been identified to the ownship in the SRAP procedure; to calculate a set of results based on lateral and vertical deviations of a paired SRAP aircraft to the ownship, and differential lateral and vertical rates of the paired SRAP aircraft to the ownship; to derive one or more points from the calculated set of results based on the lateral and vertical deviations, and differential rates to determine whether in a flight path of the ownship any occurrence of an intrusion occurs into a wake of the paired SRAP aircraft during the approach flight phase to the airport; and to generate graphic data to a cockpit display to present on the cockpit display any occurrence of the intrusion in the wake of the flight path of the ownship to the paired SRAP aircraft during the approach flight phase.

In an exemplary embodiment, the apparatus includes the at least one processor programmed to display, on the cockpit display, a pair of vertical profiles displaying the flight path of the ownship and the paired SRAP aircraft together to monitor an intrusion in the wake of the paired SRAP aircraft in the flight path of the ownership.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
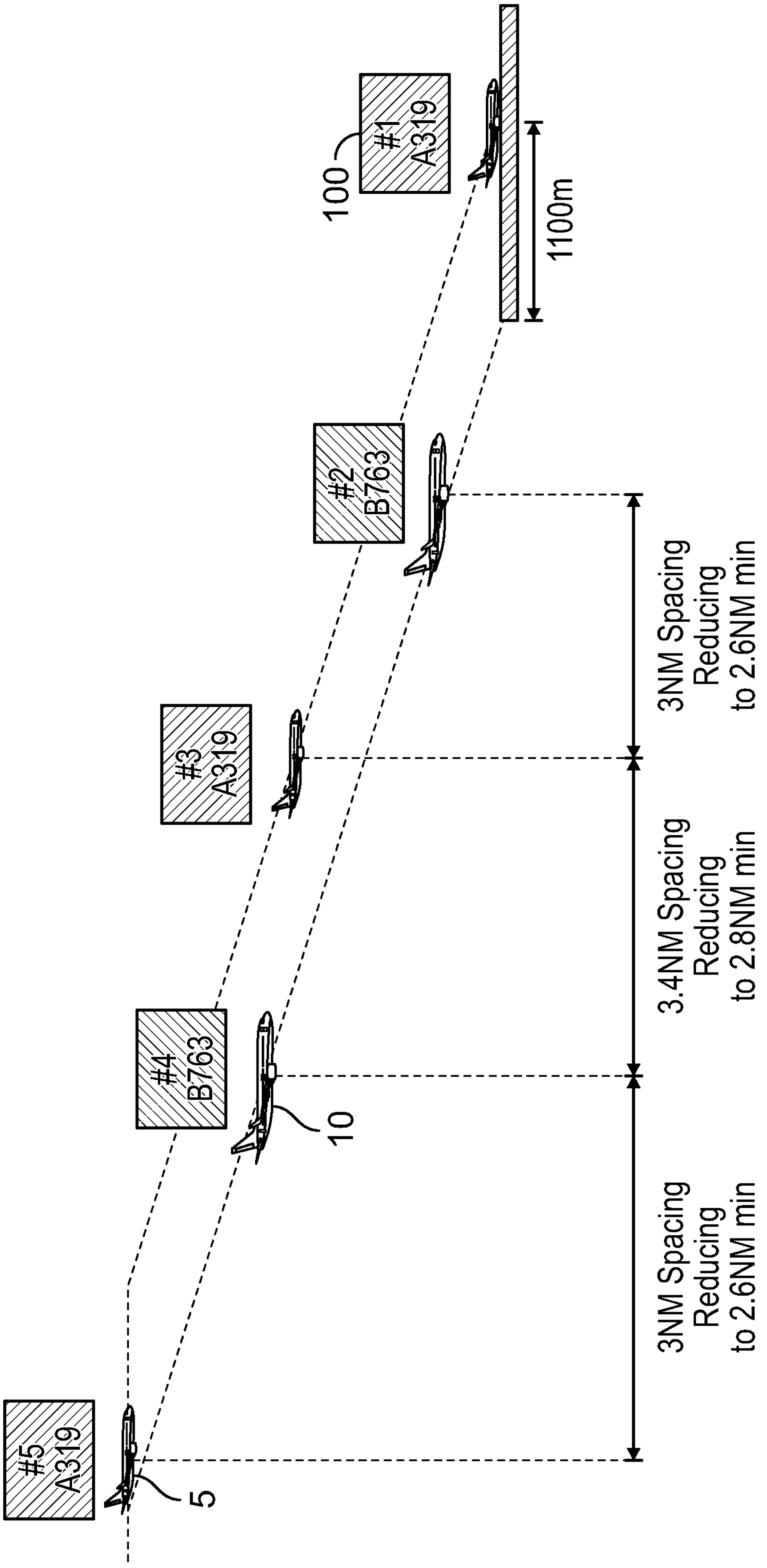
FIG. 1 is a diagram of an exemplary model for the SRAP approach for an aircraft in accordance with one or more embodiments.

Embodiments of the subject matter described herein generally relate to systems, methods, and apparatus for graphically depicting the spatial relationship between an approach route of travel (in this case a flight route of an approach to the airport) for a vehicle and one or more matched or paired vehicles in a vicinity of the route. While the subject matter described herein could be utilized in various applications or the context of various types of vehicles (e.g., aircraft, drones, automobiles, marine vessels, trains, or the like), exemplary embodiments are described herein in the context of depicting the operating the vehicles with respect to a flight plan of an approach for an aircraft. In this regard, exemplary embodiments may be described herein primarily in the context of aircraft; however, it should be appreciated the subject matter described herein is not limited to any particular type or combination of vehicles.

Under the ATM Research Joint Undertaking (SESAR JU) project entitled "Enhanced Arrivals and Departures," SRAP may allow a lighter aircraft to avoid the turbulence generated by the wake vortex of the heavier aircraft, thereby enabling increased throughput by allowing both aircraft to land on the same runway.

In various exemplary embodiments, the present disclosure describes methods and systems to calculate and display the lateral and vertical spacing, and/or deviation of the paired aircraft for the SRAP approach procedure with the ownship. Further, the present disclosure describes methods and systems to calculate and display the difference of the lateral and vertical differential rate of the paired aircraft, to enable aircraft systems to select the paired SRAP aircraft from the displayed traffic on the Multi-function display (MFD) and to display the vertical profile of the paired SRAP aircraft for enhanced situational awareness.

In other exemplary embodiments, the critical parameters can be sent to the heads up display (HUD), where the pilot can obtain visual representations of the secondary approach parameters for enabling flight operations of the approach in a heads up display presentation.

In one or more exemplary embodiments, an alert for the point at a location on a navigation display can be shown as to where or when a paired aircraft that is located above will or likely will intrude into the wake of the paired SRAP aircraft located below will occur. The location is calculated by aircraft processing systems that can be shared between the set of paired aircraft and can be annunciated aurally and presented visually at a selected time by each aircraft's processing system. For example, the alert can be presented 2 minutes early to the crew so that corrective action can be applied by the pilot or corrected automatically by aircraft control systems. Also, in a cockpit display, the wake threat for the ownship or the other paired aircraft can be presented on the MFD.

In various exemplary embodiments, the two-dimensional lateral heading and distance between the ownship and the paired vehicle can be depicted on a navigational map concurrently with a graphical representation of the flight plan route, thereby allowing the pilot, co-pilot, or other aircraft operator or user to analyze the lateral distance between both aircraft and to select and identify one of the numerous aircraft shown on the navigational map for pairing and for implementing the SRAP approach.

In various exemplary embodiments, the lateral and vertical range of both vehicles may be depicted on a vertical profile display (or vertical situation display) concurrently with a graphical representation of the vertical profile of the flight plan route, thereby allowing the pilot to analyze the vertical separation distance in an approach with the SRAP executed. In this regard, in exemplary embodiments, the navigational map and the corresponding vertical profile display are concurrently presented on a conventional display device, thereby allowing a pilot or other user to correlate the lateral and vertical spacing of the paired vehicles with respect to the flight plan on SRAP approach, and thereby mentally gauge the three-dimensional operating spacing between each vehicle.

The position of the other aircraft is determined and depicted concurrently with respect to the depicted position of the ownship in the SRAP approach. In this regard, the position of the other aircraft may be continually and dynamically determined, such that graphical indication of the current or anticipated movement of the other vehicle may also be provided on display to the ownship thereby providing situational awareness of SRAP approach and spacing differences between paired aircraft sets for real-time evaluation of the potential risks posed by both aircraft during the approach and reduce any risk perceived or actual by manual or automated increases or decreases in spacing between the paired aircraft during the approach operation.

In various exemplary embodiments, the present disclosure describes presenting the wake turbulence alerts on the HUD (Head-Up Display) for better situational awareness. Also, once a wake turbulence threat is detected, methods and systems are provided to enable automated corrective actions to be executed by the crew in the approach flight phase to alleviate workload in the work-intensive approach and landing phases. For example, the crew can follow the automated corrective actions suggested and presented to reduce the threat intensity and to continue the safe operation of the aircraft.

Also, the present disclosure describes methods, systems, and apparatuses to determine when SRAP preconditions are satisfied, and identifying the paired Aircraft performing the SRAP approach and displays the paired Aircraft with the ownship, the flight path and the Approach Profile on the Lateral Map display and the Vertical profile display for monitoring. Further, in exemplary embodiments, a set of options is provided to the user to enable displaying additional information about the SRAP aircraft by selecting an SRAP display menu option in a graphic user interface display. This can enable the crew to further configure intrusion alerts into the wake envelope of the SRAP paired aircraft when navigating in an SRAP approach.

Referring now to FIG. 1, FIG. 1 illustrates an exemplary diagram of the SRAP approach via a secondary runway. The SRAP model has been looked at by the EUROCONTROL in a Single European Sky ATM Research Joint Undertaking (SESAR JU) project called "Enhanced Arrivals and Departures," that was created to evaluate the use of various deployment tools and procedures to increase flight approach capacities at various European airports. The SRAP model can provide use of a secondary runway model for light wake aircraft 5 to fly a final approach above the profile of a heavier aircraft 10, which creates more wake with both aircraft approaching the primary runway thereby reducing the wait time for a new slot by the light aircraft since it can make the approach in conjunction with an approach of a slot already allocated to the heavier aircraft at a primary runway.

Eurocontrol has used video recordings of flight parameters, including three-dimensional positioning, vertical speed, airspeed, thrust, and weight, to assess the approach and landing performance of each flight crew. The SRAP model has avionics equipage requirements for approaches that use navigation guidance, such as a Ground-Based Augmentation System (GBAS) Landing System (GLS) or required navigation performance (RNP) localizer with vertical guidance (LPV) approach based on an aircraft equipped with a satellite-based augmentation system (SBAS) receiver. When combining SRAP with Increased Glide Slope, additional onboard flight assistance functions to pilots may be needed for aircraft types to facilitate energy management and flare when the slope is increased between 3.5 degrees and limited to 4.49 degrees maximum. On the airport ground infrastructure, both SRAP and IGS-to-SRAP are to be supported with the implementation of specific visual aids, covering a second set of the runway markings, approach lighting system, and visual approach slope indicators.

The SRAP in FIG. 1 is located 1,100 m (100) after the primary runway threshold. A standard Instrument Landing System (ILS) with a 3-degree glide slope was implemented, serving the primary runway aiming point. For the SRAP, a GLS (ILS-like) approach with a 3-degree glideslope and an RNP approach with a 3.5-degree glide path to simulate an Increased Glide Slope (IGS) operation were flown.

Figure 2:
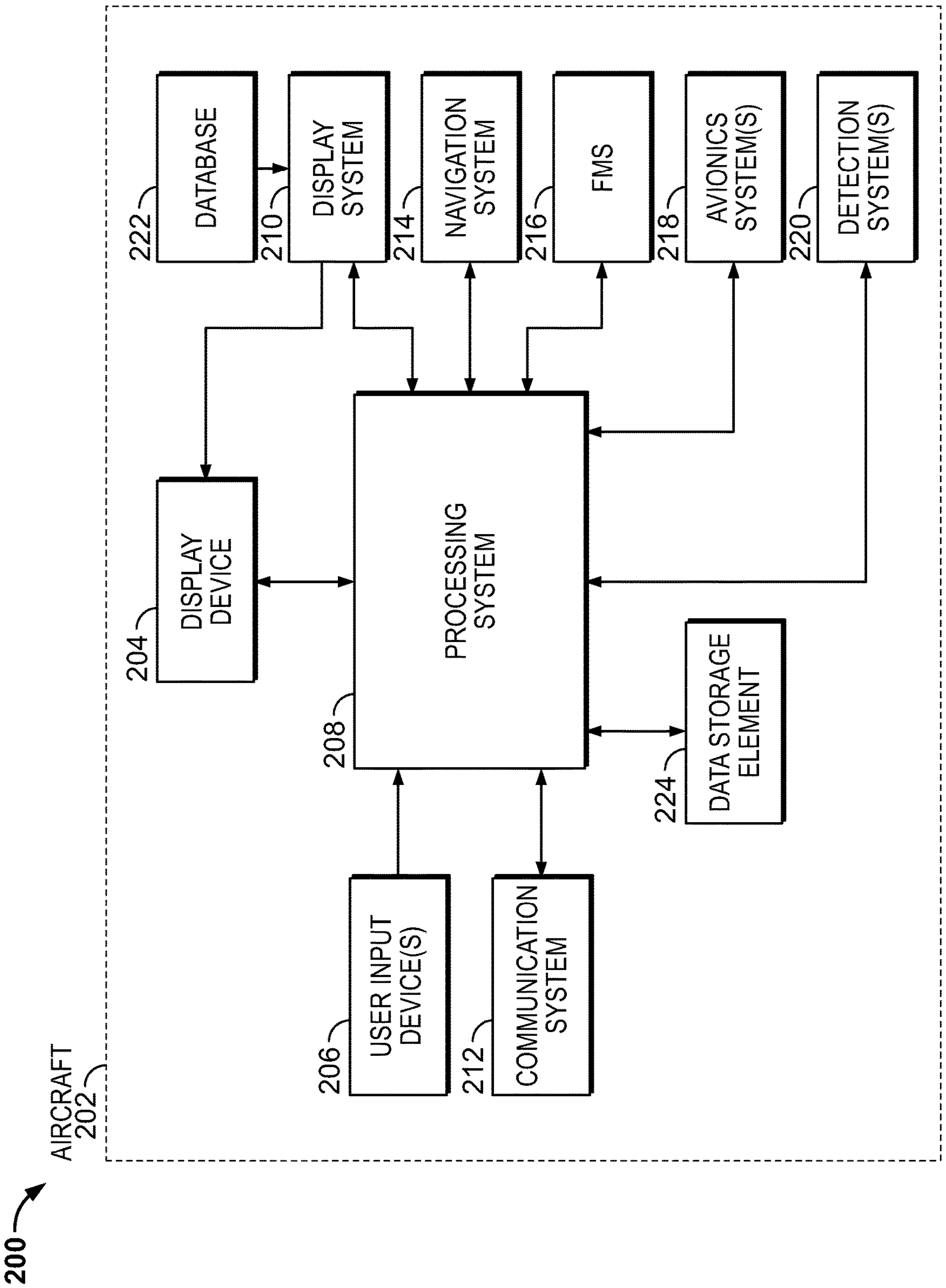
FIG. 2 depicts an exemplary aircraft processing system for implementing the SRAP approach procedures onboard the aircraft in accordance with one or more embodiments.

FIG. 2 depicts an exemplary embodiment of a system 200 for the SRAP approach which may be located onboard a vehicle, such as an aircraft 202, includes, without limitation, a display device 204, a user input device 206, a processing system 208, a display system 210, a communications system 212, a navigation system 214, a flight management system (FMS) 216, one or more avionics systems 218, detection systems 220, and one or more data storage elements 222, 224 cooperatively configured to support the operation of the system 200, as described in greater detail below.

In exemplary embodiments, the display device 204 is realized as an electronic display capable of graphically displaying flight information or other data associated with the operation of the aircraft 202 under control of the display system 210 and/or processing system 208. In this regard, the display device 204 is coupled to the display system 210 and the processing system 208, wherein the processing system 208 and the display system 210 are cooperatively configured to display, render, or otherwise convey one or more graphical representations or images associated with the operation of the aircraft 202 on the display device 204. For example, as described in greater detail below, a navigational map that includes a graphical representation of the aircraft 202 and one or more of the terrain, meteorological conditions, airspace, air traffic, navigational reference points, and a route associated with a flight plan of the aircraft 202 may be displayed, rendered, or otherwise presented on the display device 204.

The user input device 206 is coupled to the processing system 208. The user input device 206 and the processing system 208 are cooperatively configured to allow a user (e.g., a pilot, co-pilot, or crew member) to interact with the display device 204 and/or other elements of the aircraft system 200, as described in greater detail below. Depending on the embodiment, the user input device 206 may be realized as a keypad, touchpad, keyboard, mouse, touch panel (or touchscreen), joystick, knob, line select key, or another suitable device adapted to receive input from a user. In some embodiments, the user input device 206 may also be realized as an audio input device, such as a microphone, audio transducer, audio sensor, or the like, that is adapted to allow a user to provide audio input to the aircraft system 200 in a “hands-free” manner without requiring the user to move his or her hands, eyes and/or head to interact with the aircraft system 200.

The processing system 208 generally represents the hardware, circuitry, processing logic, and/or other components configured to facilitate communications and/or interaction between the elements of the aircraft system 200 and perform additional processes, tasks and/or functions to support the operation of the aircraft system 200, as described in greater detail below. Depending on the embodiment, the processing system 208 may be implemented or realized with a general-purpose processor, a controller, a microprocessor, a microcontroller, a content addressable memory, a digital signal processor, an application-specific integrated circuit, a field-programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 200 described in greater detail below. Furthermore, the steps of a method or algorithm described in connection with the embodiments disclosed herein may be embodied directly in hardware, in firmware, in a software module executed by the processing system 208, or in any practical combination thereof. In accordance with one or more embodiments, the processing system 208 includes or otherwise accesses a data storage element 224, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 208, cause the processing system 208 to execute and perform one or more of the processes, tasks, operations, and/or functions described herein.

For example, in exemplary embodiments, the processing system 208, with instructions stored in the memory, may be configured to implement applications and solutions to calculate and display the lateral and vertical deviation of the paired SRAP aircraft with respect to the ownship and to calculate and display the differential lateral and vertical differential rate of the paired aircraft. Also, the processing system 208 may be configured to calculate the point where the aircraft above will intrude into the wake of the paired SRAP aircraft below and make annunciations aurally and visually in advance (i.e., 2 mins early to the crew so that corrective action be applied).

The display system 210 generally represents the hardware, firmware, processing logic and/or other components configured to control the display and/or to render of one or more displays pertaining to the operation of the aircraft 202 and/or systems 212, 214, 216, 218, 220 on the display device 204 (e.g., synthetic vision displays, navigational maps, and the like). In this regard, the display system 210 may access or include one or more databases 222 suitably configured to support operations of the display system 210, such as, for example, a terrain database, an obstacle database, a navigational database, a terminal airspace database, a special use airspace database, or other information for rendering and/or displaying navigational maps and/or other content on the display device 204. In this regard, in addition to including a graphical representation of terrain, a navigational map displayed on the display device 204 may include graphical representations of navigational reference points (e.g., waypoints, navigational aids, distance measuring equipment (DMEs), very high-frequency omnidirectional radio ranges (VORs), and the like), designated special use airspaces, obstacles, and the like overlying the terrain on the map.

Notably, although an existing cockpit display screen system may be used to display the above-described flight information symbols and data, the present disclosure is not intended to be so limited and may include any suitable type of display medium capable of visually presenting multi-colored or monochrome flight information for a pilot or other flight crew member. As such, many known display monitors are suitable for displaying such flight information, such as, for example, various CRT and flat-panel display systems (e.g., CRT displays, LCDs, OLED displays, plasma displays, projection displays, HDDs, HUDs, etc.). For example, display device 204 may be implemented as a heads-down Primary Flight Display or as a heads-up display (HUD). In an exemplary embodiment, the display can be configured to present the wake threat for the ownship on the MFD, to enable the ability to select (manually by viewing the MFD or automatically) the paired SRAP aircraft from the displayed traffic on the MFD, to enable the display in the vertical profile of the paired SRAP aircraft for enhanced situational awareness and to enable critical parameters to be sent to the HUD for the pilot to receive a visual representation of the secondary approach parameters so that the pilot can fly the approach heads up.

Still referring to FIG. 2, in an exemplary embodiment, the processing system 208 is coupled to the navigation system 214, which is configured to provide real-time navigational data and/or information regarding the operation of the aircraft 202. The navigation system 214 may be realized as a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support the operation of the navigation system 214, as will be appreciated in the art. The navigation system 214 is capable of obtaining and/or determining the instantaneous position of the aircraft 202, that is, the current (or instantaneous) location of the aircraft 202 (e.g., the current latitude and longitude) and the current (or instantaneous) altitude (or above ground level) for the aircraft 202. The navigation system 214 is also capable of obtaining or otherwise determining the heading of the aircraft 202 (i.e., the direction the aircraft is traveling in relative to some reference).

In an exemplary embodiment, the processing system 208 is also coupled to the FMS 216, which is coupled to the navigation system 214, the communications system 212, and one or more additional avionics systems 218 to support navigation, flight planning, and other aircraft control functions in a conventional manner, as well as to provide real-time data and/or information regarding the operational status of the aircraft 202 to the processing system 208. It should be noted that although FIG. 2 depicts a single avionics system 218, in practice, the aircraft system 200 and/or aircraft 202 will likely include numerous avionics systems for obtaining and/or providing real-time flight-related information that may be displayed on the display device 204 or otherwise provided to a user (e.g., a pilot, a co-pilot, or crew member). For example, practical embodiments of the aircraft system 200 and/or aircraft 202 will likely include one or more of the following avionics systems suitably configured to support the operation of the aircraft 202: a weather system, an air traffic management system, a radar system, a traffic avoidance system, an autopilot system, an auto thrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 220 generally represents the component(s) of the aircraft 202 that is coupled to the processing system 208 and/or the display system 210 to generate or otherwise provide information indicative of various objects or regions of interest within the vicinity of the aircraft 202 that are sensed, detected, or otherwise identified by a respective onboard detection system 220. For example, an onboard detection system 220 may be realized as a radar system that measures, senses, or otherwise detects other aircraft in the vicinity of the aircraft 202 and provides corresponding radar data (e.g., radar imaging data, range setting data, angle setting data, and/or the like) to one or more of the other onboard systems 208, 210, 214, 216, 218 for further processing and/or handling.

For example, the processing system 208 and/or the display system 210 may generate or otherwise provide graphical representations of an aircraft for identification for use in the SRAP approach. The processing system 208 may provide information on the spacing between the paired aircraft in the SRAP approach, where the paired aircraft is identified by the onboard detection system 220 on the display device 204 (e.g., on or overlying a lateral navigational map display). In another embodiment, an onboard detection system 220 may be realized as a collision-avoidance system that measures, senses, or otherwise detects and/or monitor air traffic such as the paired aircraft, obstacles, terrain and/or the like in the vicinity of the aircraft 202 and provides corresponding detection data to one or more of the other onboard systems 208, 210, 214, 216, 218.

In the illustrated embodiment, the processing system 208 is also coupled to the communications system 212, which is configured to support communications to and/or from the aircraft 202 via a communications network. For example, the communications system 212 may also include a data link system or another suitable radio communication system that supports communications between the aircraft 202 and one or more external monitoring systems, air traffic control, and/or another command center or ground location. In this regard, the communications system 212 may allow the aircraft 202 to receive information that would otherwise be unavailable to the pilot and/or co-pilot using the onboard systems 214, 216, 218, 220.

It should be understood that FIG. 2 is a simplified representation of the aircraft system 200 for purposes of explanation and ease of description, and FIG. 2 is not intended to limit the application or scope of the subject matter described herein in anyway. It should be appreciated that although FIG. 2 shows the display device 204, the user input device 206, and the processing system 208 as being located onboard the aircraft 202 (e.g., in the cockpit), in practice, one or more of the display device 204, the user input device 206, and/or the processing system 208 may be located outside the aircraft 202 (e.g., on the ground as part of an air traffic control center or another command center) and communicatively coupled to the remaining elements of the aircraft system 200 (e.g., via a data link and/or communications system 212). In some embodiments, the display device 204, the user input device 206, and/or the processing system 208 may be implemented as an electronic flight bag that is separate from the aircraft 202 but capable of being communicatively coupled to the other elements of the aircraft system 200 when onboard the aircraft 202. Similarly, in some embodiments, the data storage element 224 may be located outside the aircraft 202 and communicatively coupled to the processing system 208 via a data link and/or communications system 212. Furthermore, practical embodiments of the aircraft system 200 and/or aircraft 202 will include numerous other devices and components for providing additional functions and features, as will be appreciated in the art. In this regard, it will be appreciated that although FIG. 2 shows a single display device 204, in practice, additional display devices may be present onboard the aircraft 202. Additionally, it should be noted that in other embodiments, features and/or functionality of processing system 208 described herein can be implemented by or otherwise integrated with the features and/or functionality provided by the display system 210 or the FMS 216, or vice versa. In other words, some embodiments may integrate the processing system 208 with the display system 210 or the FMS 216; that is, the processing system 208 may be a component of the display system 210 and/or the FMS 216.

Figure 3:
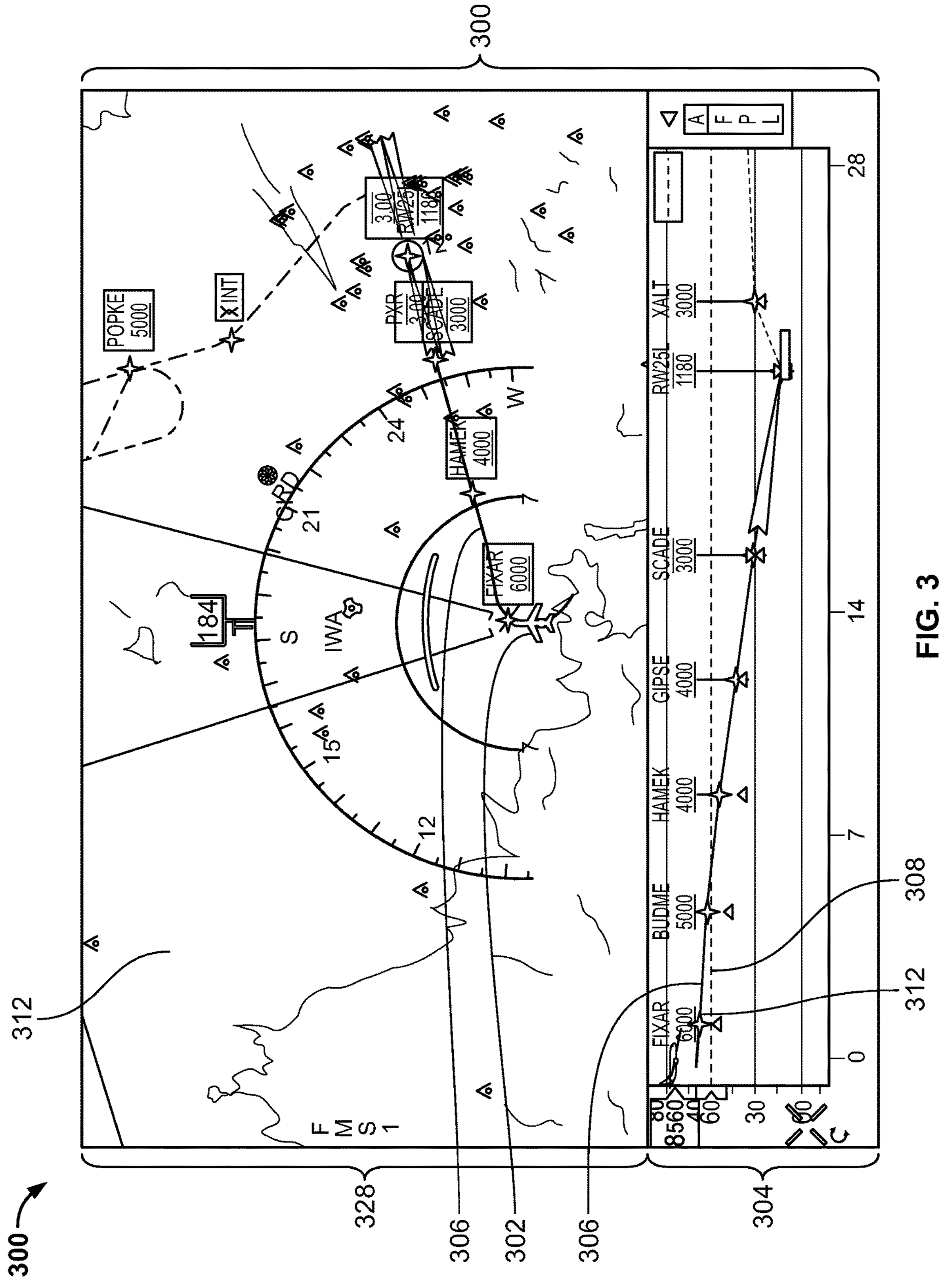
FIG. 3 depicts exemplary graphical user interface (GUI) displays suitable for implementing the SRAP approach procedures prior to aircraft pairing on a display device onboard the aircraft in the system of FIG. 2 in accordance with one or more embodiments.

FIG. 3 depicts an exemplary graphical user interface (GUI) display 300 prior to the SRAP application being executed, and the paired aircraft identified, in accordance with various embodiments. The GUI display 300 may be displayed, rendered, or otherwise presented by the processing system 208 and/or display system 210 on a display device 204 onboard an aircraft 202 in conjunction with the ownship display process of FIG. 2. FIG. 3 displays the lateral and vertical position of the ownship 302 prior to being paired with a paired SRAP aircraft for the approach to the destination airport.

The graphical user interface display includes a navigational map display 320 and a vertical profile display 304 adjacent to the navigational map display 320. The navigational map 312 includes a graphical representation of a portion of route 306 defined by a flight plan for the ownship 302, while the vertical profile display 304 includes a graphical representation of the vertical profile of the portion of the flight plan route 306 depicted on the navigational map 312 of an approach ahead for the ownship 302 or otherwise yet to be flown path by the ownship 302. In this regard, the illustrated vertical profile display 304 includes a graphical representation of the ownship 302 that is disposed at or near a left edge of the vertical profile display 304 at a vertical position that corresponds to the current altitude of the ownship 302, with the vertical profile of the route 306 extending from the left edge of the vertical profile display 304 towards the right of the vertical profile display 304 with vertical positions at the respective horizontal positions along with the route 306 corresponding to the planned altitude for the ownship 302 at the navigational reference points or geographic locations corresponding to the respective horizontal positions on the vertical profile display 304 with respect to the current aircraft position. In this case, the ownship 302 is labeled with the flight number "FIXAR" currently on a "184" heading.

The illustrated navigational map 312 includes a graphical representation of the ownship 302 overlaid or rendered on top of a background. The background comprises a graphical representation of the terrain, topology, navigational reference points, airspace designations and/or restrictions, or other suitable items or points of interest corresponding to the currently displayed area of the navigational map, which may be maintained in a terrain database, a navigational database, or another suitable database. For example, the display system 210 (of FIG. 2) may render a graphical representation of navigational aids (e.g., VORs, VORTACs, DMEs, and the like) and airports within the currently displayed geographic area of the navigational map 312 overlying the background. Some embodiments of navigational map 312 may also include graphical representations of airspace designations and/or airspace restrictions, cities, towns, roads, railroads, and other information. Although FIG. 3 depicts a top view (e.g., from above the ownship 302) of the navigational map 312 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 312 corresponds to the geographic area that is currently displayed in the navigational map 312, that is, the field of view about the center location of the navigational map 312. As used herein, the center location of the navigational map 312 comprises a reference location for the middle or geometric center of the navigational map 312, which corresponds to a geographic location.

In an exemplary embodiment, the navigational map 312 is associated with the movement of the ownship 302, and the aircraft symbology (ownship 302 and/or background refreshes or otherwise updates as the ownship 302 travels, such that the graphical representation of the ownship 302 is positioned over the terrain background in a manner that accurately reflects the current (e.g., instantaneous or substantially real-time) real-world positioning of the ownship 302 relative to the earth. In some embodiments, the aircraft symbology is shown as traveling across the navigational map 312 (e.g., by updating the location of the aircraft symbology with respect to the background), while in other embodiments, the aircraft symbology may be located at a fixed position on the navigational map 312 (e.g., by updating the background with respect to the aircraft graphic such that the navigational map 312 is maintained centered on and/or aligned with the aircraft graphic). Additionally, depending on the embodiment, the navigational map 312 may be oriented in a cardinal direction (e.g., oriented north-up so that moving upward on the navigational map 312 corresponds to traveling northward), or alternatively, the orientation of the navigational map 312 may be track-up or heading-up (i.e., aligned such that the aircraft symbology is always traveling in an upward direction and the background adjusted accordingly).

The SRAP aircraft follows initial a path set by the FMS, in this case, having a heading of "184" shown on the navigational map 312 prior to the execution of the SRAP system. The graphic user interface (GUI) display 300 in the cockpit gives the pilot the ability to select or evaluate the SRAP aircraft from a set of aircraft displayed on the GUI display 300 in the cockpit, which are in the vicinity of the airport, and can be paired as an SRAP aircraft for an approach with the ownship 302. In this case, the GUI display 300 displays a number of aircraft in the vicinity which can readily be viewed with the labels "FIXAR," "HAMEK," "SCADE," "RW25L", "XINT," and "POPKE" that are approaching the airport on a flight path, or already in at the destination airport or are being held in holding pattern circling the airport until a slot opens up to enable the aircraft to make an approach and landing. Hence, as is shown at a given time, there can be typically a number of aircraft kept in a holding pattern circling the airport and made to wait until a slot is open for an available runaway to enable the aircraft to approach and land. This is the typical bottleneck or traffic jam that occurs because of a limited number of available runways at the destination airport. By the implementation of the SRAP procedure, more aircraft can land closer together, and this can increase the throughput of aircraft that can land at the airport, thereby alleviating the congestion that occurs to make the landing. The SRAP procedure can open up additional slots by aircraft paired together and sequenced on a vertically separated approach path to make an approach and a subsequent landing. Hence, before the approval of the SRAP approach the GUI display 300 can receive information from the processing system 208 (of FIG. 2) for a display of a number of aircraft in a holding pattern or approaching the airport who has not yet been cleared to land because of the limited number of slots to make the actual landing and may be selected for pairing in the SRAP approach to be able as a result to land more quickly or find a slot by pairing operations with another aircraft (who already has a slot, etc.) during an approach.

Figure 4:
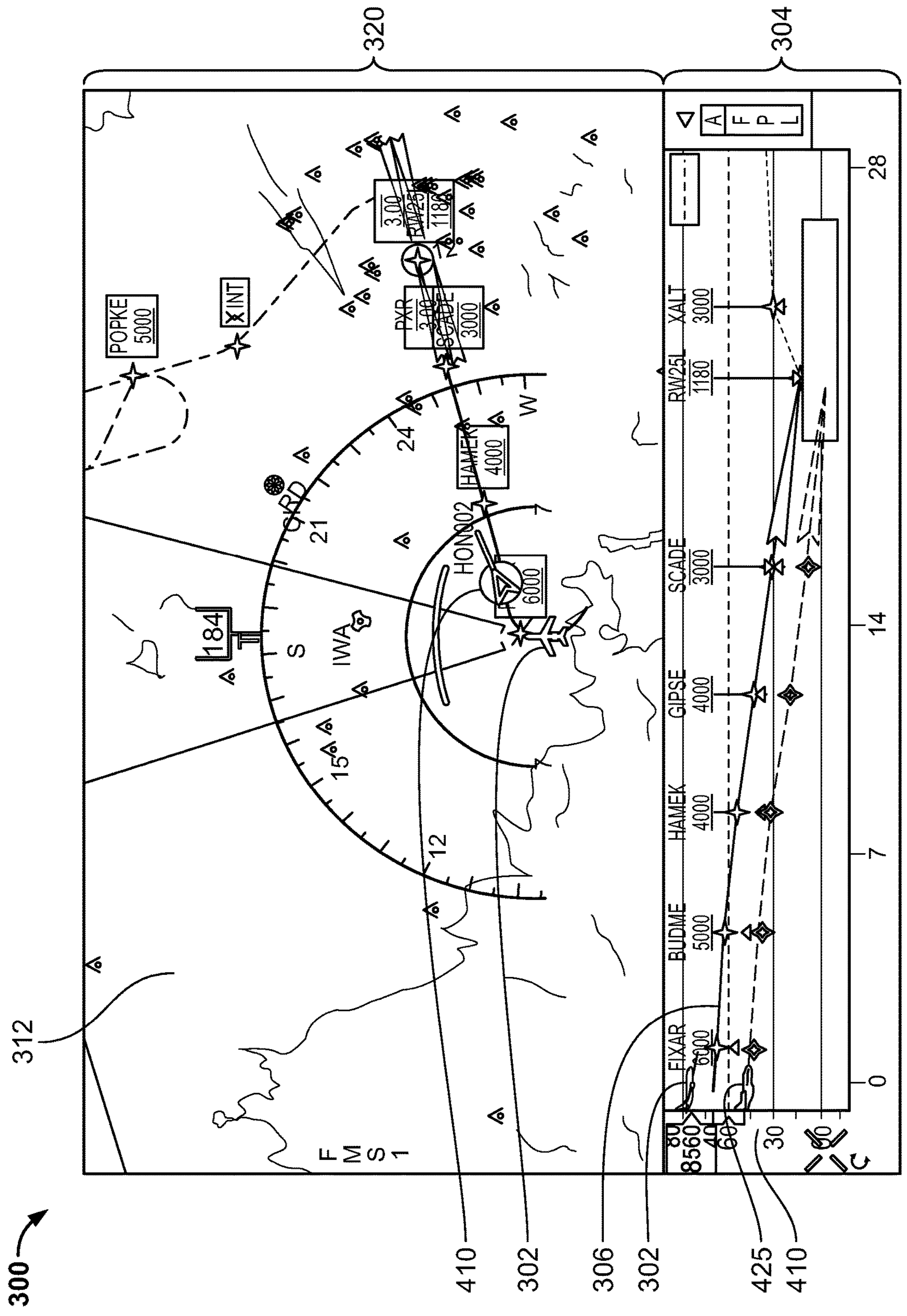
FIG. 4 depicts exemplary graphical user interface (GUI) displays suitable for implementing the SRAP approach procedures after aircraft pairing on a display device onboard the aircraft in the system of FIG. 2 in accordance with one or more embodiments.

FIG. 4 depicts an exemplary graphical user interface (GUI) display on a display device onboard an aircraft with the SRAP application executed and the paired SRAP aircraft displayed in accordance with various embodiments. In FIG. 4 (described with reference to FIG. 3), the ownship 302 is paired with the aircraft 410 labeled "HON002" on the navigational map display 320 where both aircraft follow a flight path in which both aircraft are paired to the same runway. The aircraft 410 is shown on the on approach. Hence, the processing system 208 determines that the preconditions are satisfied for the aircraft 410 that has been identified from the aircraft shown on the navigational map 312. The identified paired aircraft 410 is shown as vertical display profile 304 as aircraft 410 that is situated lower in altitude than ownship 302 during the approach. In the approach flight path 425 in the vertical display profile 304, a distance or spacing is maintained between the ownship 302 vertically during the approach. When SRAP preconditions are satisfied, the processing system identifies the paired aircraft performing SRAP approach and indicates the paired aircraft (in this case aircraft 410), the flight path and the approach profile on the navigational map display 320 (i.e., the lateral map display) and the vertical profile display 304 for monitoring by the pilot.

Figure 5:
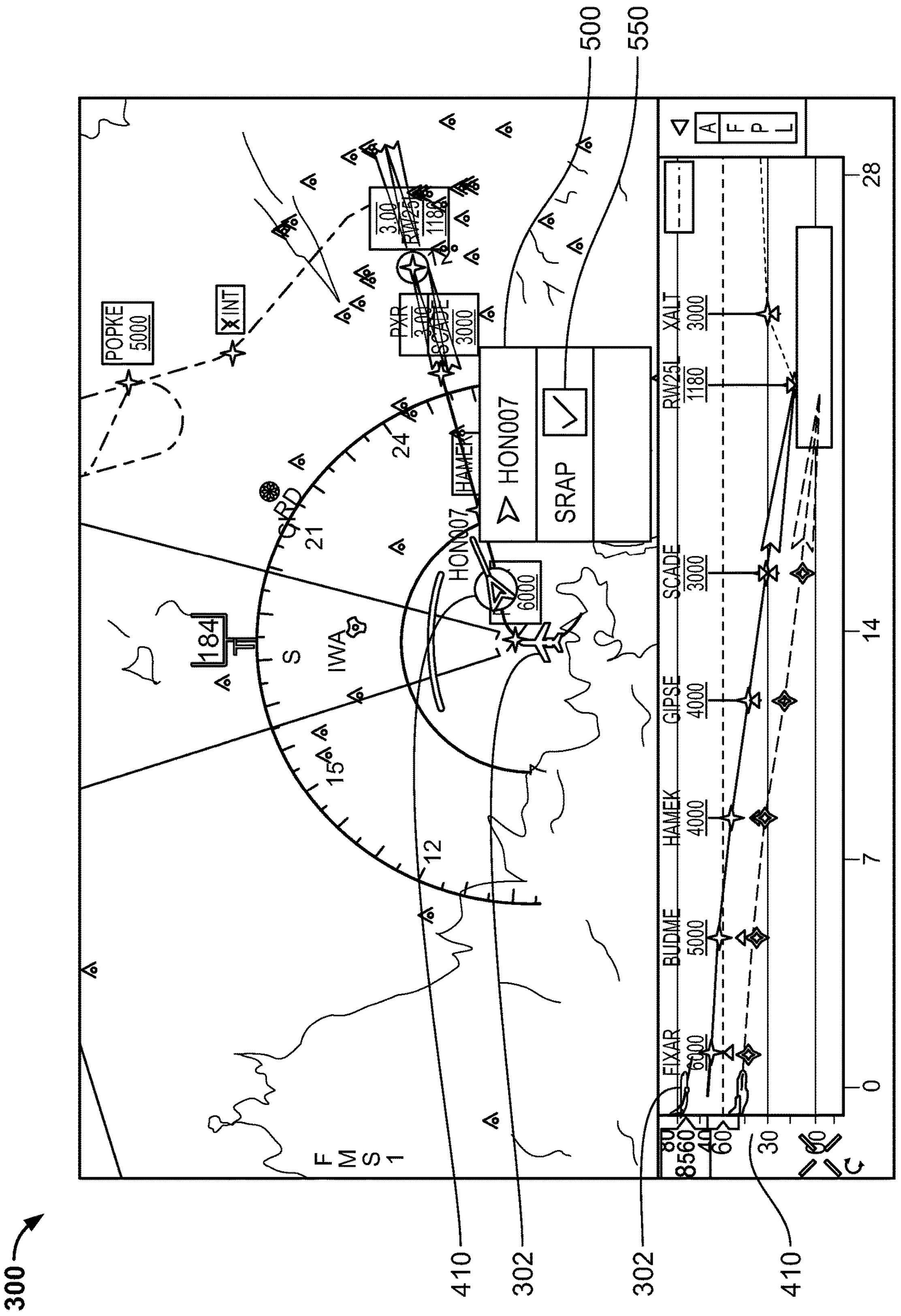
FIG. 5 depicts exemplary graphical user interface (GUI) displays with additional information suitable for implementing the SRAP approach procedures after aircraft pairing on a display device onboard the aircraft in the system of FIG. 2 in accordance with one or more embodiments.

FIG. 5 depicts another view by the exemplary graphical user interface (GUI) display 300 that may be displayed onboard an ownship 302 with the SRAP application executed and the paired SRAP aircraft displayed on the vertical display map in an approach to an airport in accordance with various embodiments. The processing system provides in FIG. 5 options to display additional information (in box 500) about the SRAP aircraft by selecting the SRAP display menu option. In a box 500, the pilot may check a box 550 to implement the SRAP application for the SRAP approach procedure for the aircraft 410 that is identified, paired, and designated in the GUI display 300 with the flight number "HON007". In an exemplary embodiment, the pilot may select the paired aircraft 410 and enable or disable the SRAP approach to the destination airport as desired.

Figure 6:
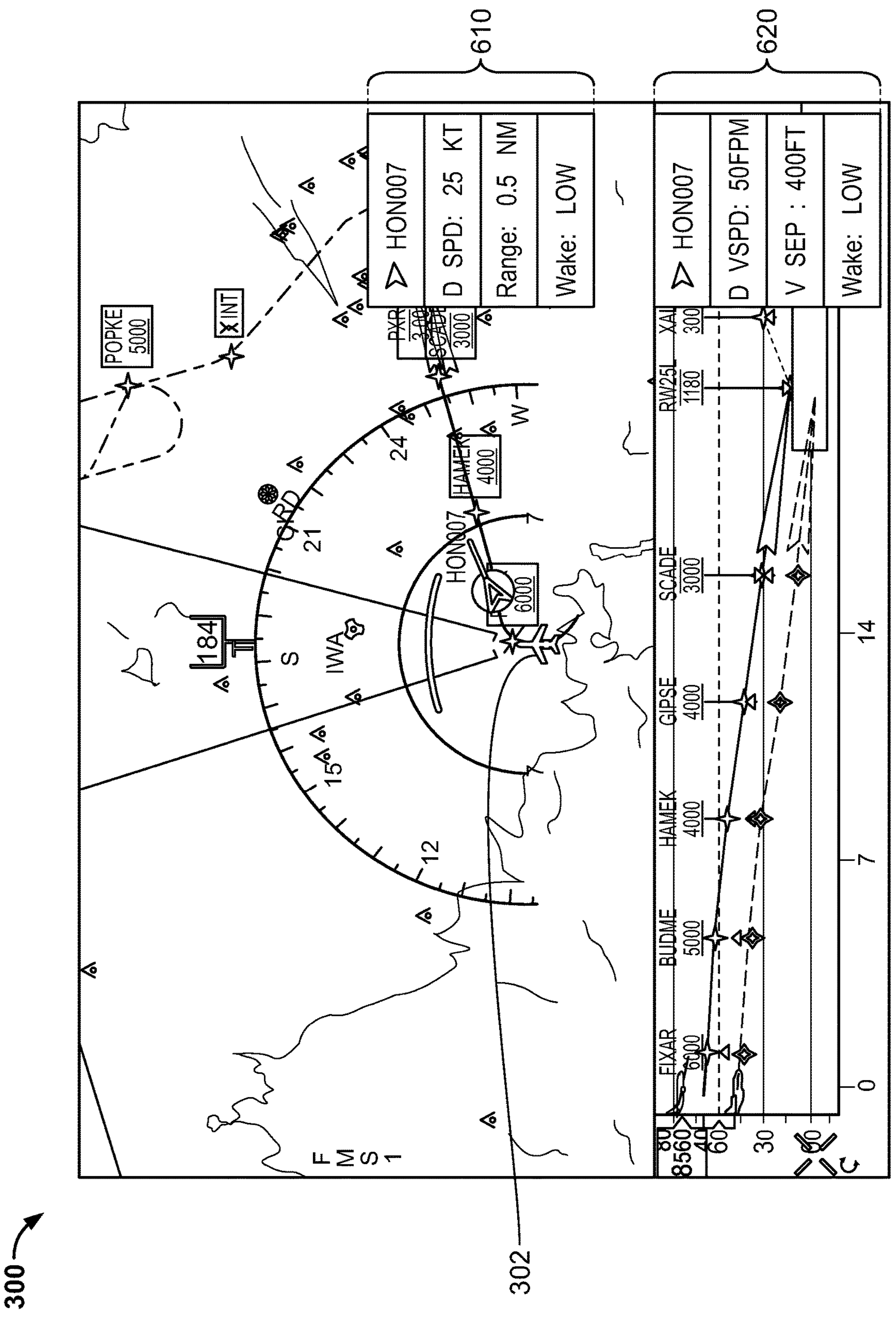
FIG. 6 depicts another exemplary graphical user interface (GUI) displays with additional information suitable for implementing the SRAP approach procedures after aircraft pairing on a display device onboard the aircraft in the system of FIG. 2 in accordance with one or more embodiments.

FIG. 6 depicts yet another view by the exemplary graphical user interface (GUI) display 300 for implementation of the SRAP approach procedure in accordance with various embodiments. The additional information displayed in box 610 and box 620 is configurable as desired by the pilot for the respective lateral and vertical displays. In the navigational map display 320, the additional information includes and is not limited to: differential speed(D.SPD)/closure Rate, lateral spacing/range, wake impact, etc. in the box 610 on the navigational map display 320 (i.e., lateral map). On the vertical situation display (VSD) or vertical profile display 304, box 620 includes the vertical speed and vertical separation for the ownship 302.

Figure 7:
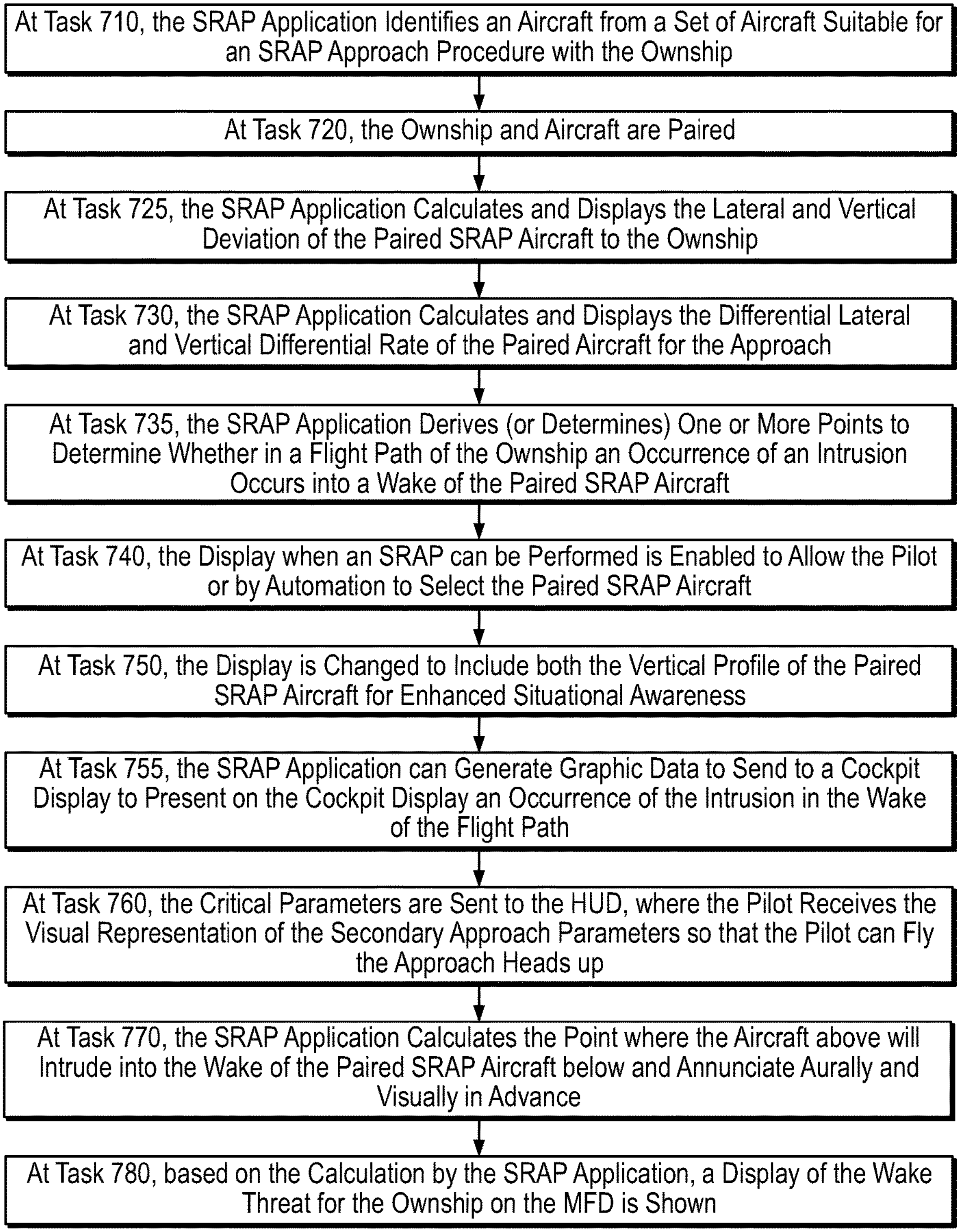
FIG. 7 depicts an exemplary flowchart for implementing the SRAP approach procedures prior to and after aircraft pairing in accordance with one or more embodiments.

FIG. 7 is an exemplary flowchart of the SRAP process in accordance with various exemplary embodiments. At task 710, the SRAP application identifies a set of aircraft that are in the vicinity of the ownership at the destination airport that is suitable for an SRAP approach procedure. The other aircraft, in instances, maybe in a holding pattern about an airport waiting for a slot to open to perform an approach or may already be cleared for an approach. If it is the latter, then even if the ownship had a prior slot allocated and this slot was after the fact, the ownership could save time and fuel and be paired with the aircraft already that is deemed suitable for the SRAP approach. The original slot allocated to the ownship can be given up for other aircraft thereby by a chain effect, throughput at the destination airport is increased with the newly open slot. At task 720, the ownship and another aircraft are paired, then the SRAP application at task 725 calculates and displays the lateral and vertical deviation of the paired SRAP aircraft with respect to the ownship. At task 730, the SRAP application calculates and displays the differential lateral and vertical differential rate of the paired aircraft for the approach. At task 735, the SRAP application derives (or determines) one or more points from the calculated set of results based on the lateral and vertical deviations, and differential rates to determine whether in a flight path of the ownship an occurrence of an intrusion occurs into a wake of the paired SRAP aircraft during the approach flight phase to the airport. At task 740, the display when an SRAP procedure can be performed is enabled to allow the pilot or by automation to select the paired SRAP aircraft from the displayed traffic on the MFD. At task 750, the display is changed to include both the vertical profile of the paired SRAP aircraft for enhanced situational awareness. At task 755, the SRAP application can generate graphic data to send to a cockpit display to present on the cockpit display an occurrence of the intrusion in the wake of the flight path of the ownship to the paired SRAP aircraft during the approach flight phase. For example, the display can display graphic data on the cockpit display to present distances between the ownship and the paired aircraft in the vertical profiles of the flight path of the ownship and the paired SRAP aircraft to visually monitor for an intrusion in the wake of the paired SRAP aircraft by the ownship. At task 760, the critical parameters are sent to the HUD, where the pilot receives the visual representation of the secondary approach parameters so that the pilot can fly the approach heads up. At task 770, the SRAP application calculates the point where the aircraft above will intrude into the wake of the paired SRAP aircraft below and annunciate aurally and visually (e.g., at 2 mins early or some other period) in advance to the crew so that any required or needed correction action can be applied in advance. At task 780, based on the calculations by the SRAP application, a display of the wake threat (i.e., wake envelope) for the ownship on the MFD is shown so that the pilot is enabled with improve situational awareness of the size of the wake envelope and can make the appropriate control decision to not intrude into air space of the wake (i.e., turbulence) during the approach and/or avoid or lessen the likelihood of the wake threat (i.e., the turbulence caused by the other aircraft).

For the sake of brevity, conventional techniques related to flight planning, drone detection, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of a Secondary Runway Aiming Point (SRAP) procedure of an approach by an ownship to an airport, the method comprising:

initiating, by an SRAP application hosted by a processor of the ownship, the SRAP procedure during an approach flight phase to the airport, wherein the processor is configured to perform the steps of:

identifying at least one aircraft from a plurality of aircraft making approaches to the airport during the ownship's approach flight phase that satisfies a set of preconditions to pair an aircraft which has been identified to the ownship in the SRAP procedure;

calculating a set of results based on lateral and vertical deviations of a paired SRAP aircraft to the ownship, and differential lateral and vertical rates of the paired SRAP aircraft to the ownship;

deriving one or more points from the calculated set of results based on the lateral and vertical deviations, and differential rates to determine whether in a flight path of the ownship an occurrence of an intrusion occurs into a wake of the paired SRAP aircraft during the approach flight phase to the airport; and generating graphic data to send to a cockpit display to present on the cockpit display an occurrence of the intrusion in the wake of the flight path of the ownship to the paired SRAP aircraft during the approach flight phase.

2. The method of claim 1, further comprising:

displaying, by the configured processor, on the cockpit display, a pair of vertical profiles displaying the flight path of the ownship and the paired SRAP aircraft together for monitoring an intrusion in the wake of the paired SRAP aircraft in the flight path of the ownership.

3. The method of claim 2, further comprising:

displaying, by the configured processor, on the cockpit display, distances between the ownship and the paired aircraft in the vertical profiles of the flight path of the ownship and the paired SRAP aircraft to visually monitor for an intrusion in the wake of the paired SRAP aircraft by the ownship.

4. The method of claim 3, further comprising:

generating, by the configured processor, a visual alert for the intrusion in the wake of the paired SRAP aircraft by the ownship during the approach flight phase to the airport.

5. The method of claim 4, further comprising:

generating, by the configured processor, the visual alert in advance of the wake intrusion by the ownship to enable corrective action by the ownship for the wake intrusion in the approach flight phase.

6. The method of claim 5, further comprising:

generating, by the configured processor, the visual alert in advance with at least two minutes of remaining flight time by the ownship in the approach flight phase.

7. The method of claim 6, further comprising:

sending, by the configured processor, the graphic data to display the visual alert on a multi-function display (MFD) within the cockpit display.

8. The method of claim 7, further comprising:

receiving, by the configured processor, user input of a selection of the aircraft on the MFD amongst a display of a set of aircraft to pair with the ownship by the SRAP application.

9. The method of claim 8, further comprising:

in response to user input of the selection of the SRAP paired aircraft, displaying by the configured processor, information about the SRAP paired aircraft on a graphic user interface (GUI) within the MFD.

10. A system to execute a Secondary Runway Aiming Point (SRAP) procedure for an approach by an ownship to an airport, the system comprising:

a processor; and a computer-readable storage medium storing an SRAP application that, when executed by the processor, causes the processor to perform the operations to:

initiate the SRAP procedure by executing an SRAP application hosted by the processer of the ownship during an approach flight phase to the airport;

the processor configured to identify by executing the SRAP application at least one aircraft from a plurality of aircraft making approaches to the airport during the ownship's approach flight phase that satisfy a set of preconditions to pair an aircraft which has been identified to the ownship in the SRAP procedure;

calculate a set of results based on lateral and vertical deviations of a paired SRAP aircraft to the ownship, and differential lateral and vertical rates of the paired SRAP aircraft to the ownship;

derive one or more points from the calculated set of results based on the lateral and vertical deviations, and differential rates to determine whether in a flight path of the ownship any occurrence of an intrusion occurs into a wake of the paired SRAP aircraft during the approach flight phase to the airport; and send graphic data to a cockpit display to present on the cockpit display any occurrence of the intrusion in the wake of the flight path of the ownship to the paired SRAP aircraft during the approach flight phase.

11. The system of claim 10, further comprising:

display, on the cockpit display, a pair of vertical profiles displaying the flight path of the ownship and the paired SRAP aircraft together to monitor an intrusion in the wake of the paired SRAP aircraft in the flight path of the ownership.

12. The system of claim 11, further comprising:

display, on the cockpit display, distances between the ownship and the paired aircraft in the vertical profiles of the flight path of the ownship and the paired SRAP aircraft to visually monitor for an intrusion in the wake of the paired SRAP aircraft by the ownship.

13. The system of claim 12, further comprising:

generate a visual alert for the intrusion in the wake of the paired SRAP aircraft by the ownship during the approach flight phase to the airport.

14. The system of claim 13, further comprising:

generate the visual alert in advance of the wake intrusion by the ownship to enable corrective action by the ownship for the wake intrusion in the approach flight phase.

15. The system of claim 14, further comprising:

generate the visual alert in advance with at least two minutes of remaining flight time by the ownship in the approach flight phase.

16. The system of claim 15, further comprising:

send the graphic data to display the visual alert on a multi-function display (MFD) within the cockpit display.

17. The system of claim 16, further comprising:

receive user input of a selection of the aircraft on the MFD amongst a display of a set of aircraft to pair with the ownship by the SRAP application.

18. The system of claim 17, further comprising:

in response to user input of the selection of the SRAP paired aircraft, display information about the SRAP paired aircraft on a graphic user interface (GUI) within the MFD.

19. An apparatus to execute a Secondary Runway Aiming Point (SRAP) procedure for an approach by an ownship to an airport, the apparatus comprising:

at least one processor deployed on a computing device, the at least one processor in communication with a computer-readable storage medium storing an SRAP application that, when executed by the processor, causes the processor to perform the operations:

to identify by executing the SRAP application at least one aircraft from a plurality of aircraft making approaches to the airport during the ownship's approach flight phase that satisfy a set of preconditions to pair an aircraft which has been identified to the ownship in the SRAP procedure;

to calculate a set of results based on lateral and vertical deviations of a paired SRAP aircraft to the ownship, and differential lateral and vertical rates of the paired SRAP aircraft to the ownship;

to determine one or more points from the calculated set of results based on the lateral and vertical deviations, and differential rates to determine whether in a flight path of the ownship any occurrence of an intrusion occurs into a wake of the paired SRAP aircraft during the approach flight phase to the airport; and to generate graphic data to a cockpit display to present on the cockpit display any occurrence of the intrusion in the wake of the flight path of the ownship to the paired SRAP aircraft during the approach flight phase.

20. The apparatus of claim 19, further comprising:

display, on the cockpit display, a pair of vertical profiles displaying the flight path of the ownship and the paired SRAP aircraft together to monitor an intrusion in the wake of the paired SRAP aircraft in the flight path of the ownership.

* * * * *